Sept. 19, 1933.  F. H. ROGERS  1,927,503
MEASURING APPARATUS
Filed Feb. 20, 1930   2 Sheets-Sheet 1
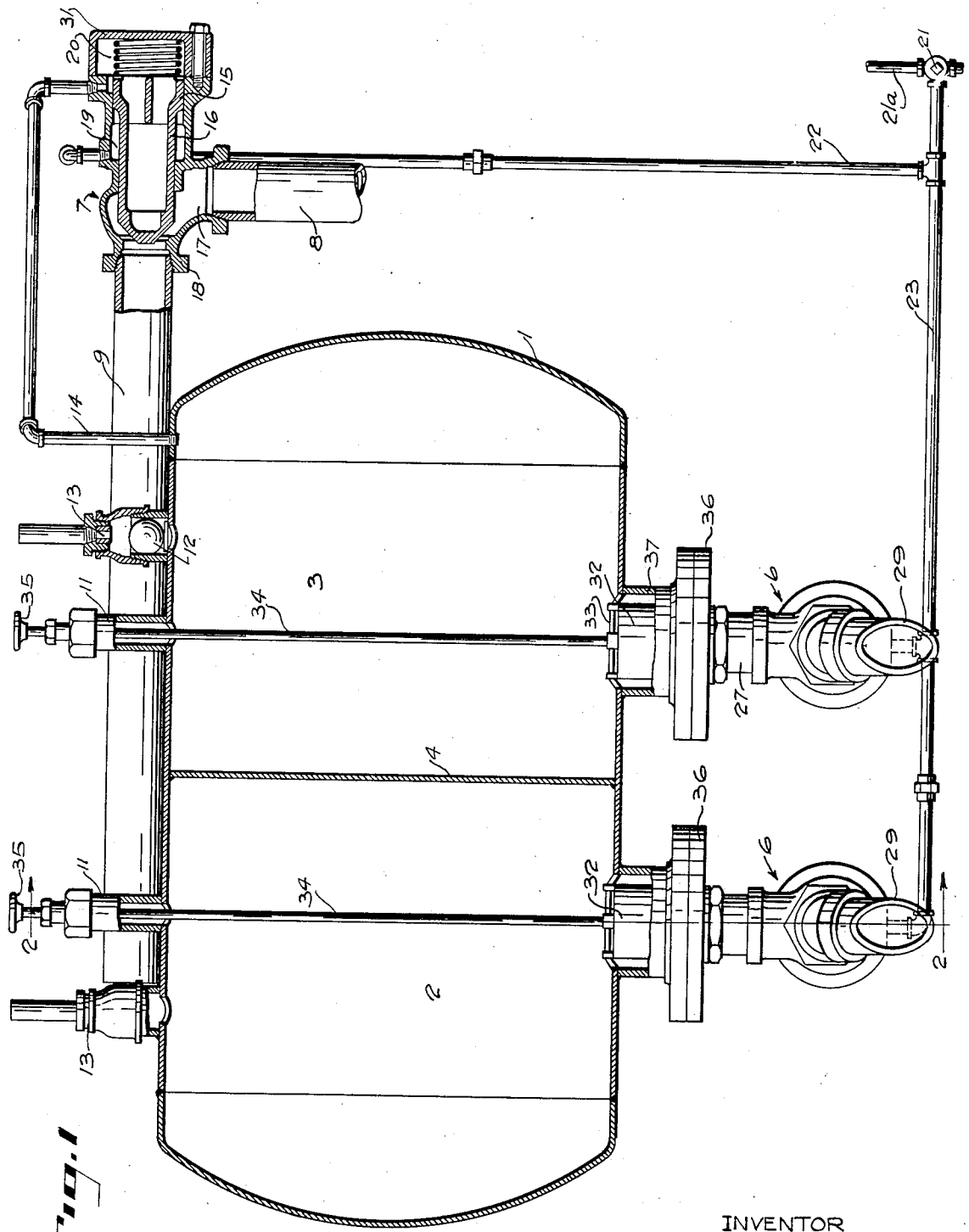
INVENTOR
Frank H. Rogers
BY
ATTORNEY

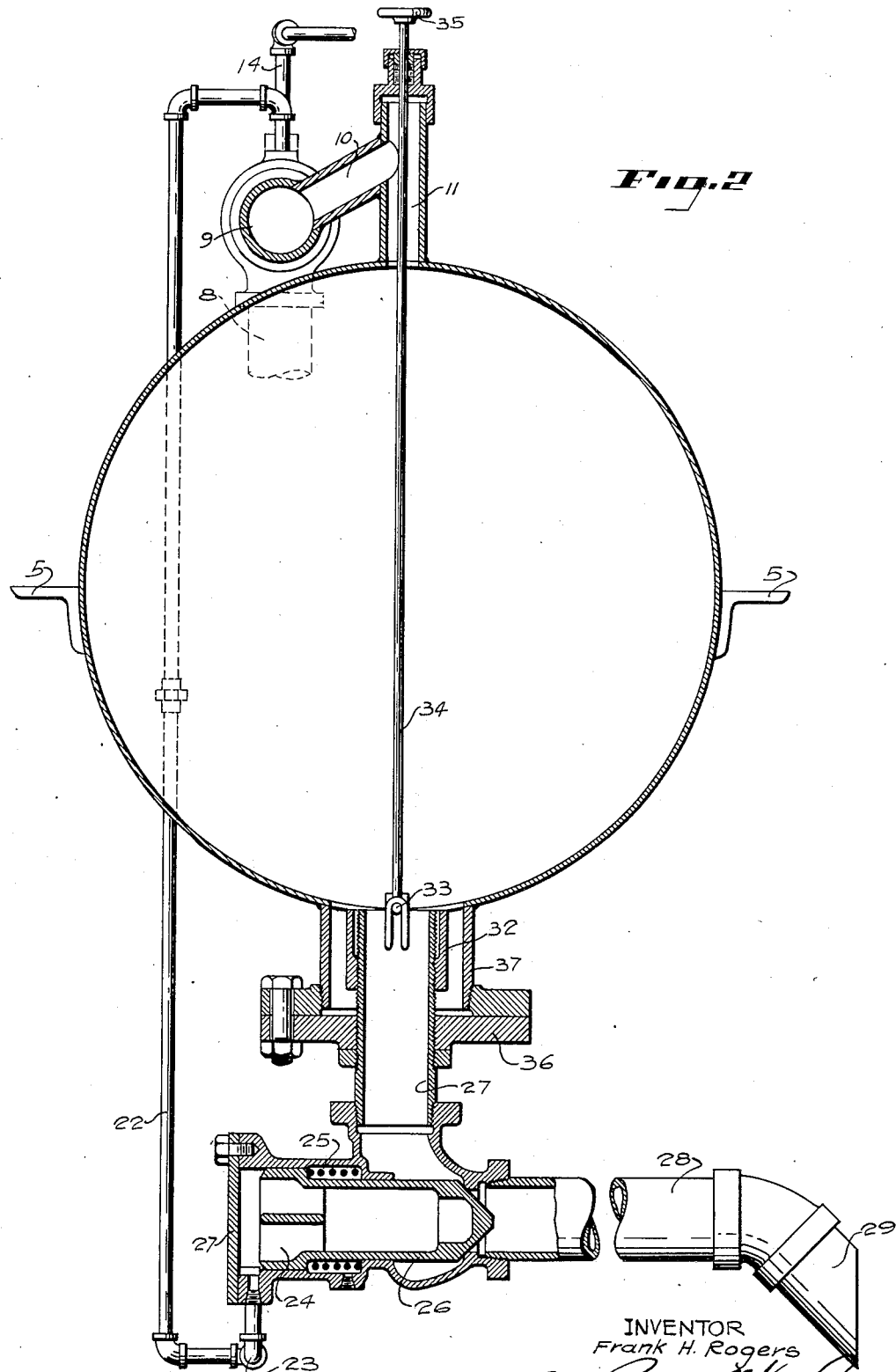

Patented Sept. 19, 1933

1,927,503

UNITED STATES PATENT OFFICE 1,927,503

MEASURING APPARATUS

Frank H. Rogers, Ardmore, Pa., assignor, by mesne assignments, to Baldwin-Southwark Corporation, a corporation of Delaware Application February 20, 1930. Serial No. 429,883

16 Claims. (Cl. 221—111)

This invention relates generally to measuring equipment and more particularly to improved control and distribution means for volumetric fluid measuring apparatus, especially adapted for liquids. While the specific aspect of the invention, as illustrated herein, is of special significance in the field of commercial refrigeration, wherein blocks of ice are manufactured, it will of course be understood that the same is applicable to other fields wherein it is necessary or desirable to measure given quantities of fluid.

In the manufacture of ice it is desirable to have the blocks of substantially the same weight or volume for various well known reasons. With the usual methods of manufacture a plurality of cans are usually filled simultaneously each with a measured amount of liquid. The liquid for the respective cans is measured in individual compartments or containers, each of which has its own pipe or nozzle for discharging the liquid when measured into its respective can. The valve mechanisms for controlling the refilling and discharge of the measuring compartments are usually manually operated, thus involving difficulties not only with the valve structures, but also with the manual operation thereof.

It is an object of my invention to provide an improved control and distribution means for measuring apparatus, and more particularly to provide such improved means as will be especially adapted to permit the filling of a series of cans from individual compartments each of which is provided with an individual discharge control valve. A further object is to provide improved means for controlling the filling operation and also to provide an improved arrangement for co-ordinating the filling and discharge operations. A more specific object of my invention is to provide an improved valve structure, arrangement and system of valve control whereby the cans may be quickly and accurately filled with a minimum amount of effort and attention on the part of the operator, and without unnecessary waste of liquid. A further specific object is to provide an improved arrangement whereby the valve mechanisms are actuated by liquid. The arrangement is particularly adapted to permit this actuating liquid to be obtained from the same source as is used for the filling liquid thereby eliminating the danger of contaminating the filling liquid by leakage as might be the case where an external source of pressure fluid was used. Under certain conditions of operation, however, any suitable source may be used if desired. These several features are accomplished, in part, by the provision of improved means for automatically controlling at least certain of the valves.

Other objects and advantages will be more readily seen by those skilled in the art from the following description of the accompanying drawings which illustrate one specific embodiment that the invention may assume, and wherein, Fig. 1 is a vertical longitudinal section through the filling tank with certain parts shown in elevation, Fig. 2 is a vertical transverse section taken substantially on the line 2—2 of Fig. 1.

In the illustrated embodiment of my invention I have shown a tank 1 which in cross section is of circular form although any suitable form may be employed. The tank may be as long as is necessary to provide the requisite number of individual compartments which herein are specifically shown as two in number, at 2 and 3. It will of course be understood that there may be employed any number of compartments of substantially predetermined volumetric capacity. With my improved control arrangement the number of compartments may be increased indefinitely without causing the operator to expend any more energy or attention during operation than if only one compartment was used.

The compartments are formed, for instance, by a suitable partition 4 secured by any suitable means to the wall of the tank which may be provided with any exterior supporting brackets in the form of longitudinally extending angle irons 5. Each compartment is provided with its own discharge valve mechanism, generally indicated at 6, while the refilling control valve mechanism common to all compartments is generally indicated at 7. Water is supplied to each compartment from any suitable source through an inlet pipe 8, past the valve mechanism 7 and through a header 9 from which it passes through a series of upwardly extending lateral pipes 10 connected respectively with each of the compartments as by pipes 11. Assuming that the discharge valve mechanisms 6 are all closed, the compartments are filled simultaneously. As the liquid rises to the top of each compartment a float ball check valve 12 is raised against a suitable seat to close atmospheric vent passage 13 which is open during filling to permit complete and rapid filling of each compartment. Upon closure of these vents discharge of water from the compartments is prevented.

When the compartments all become filled, fluid pressure is transmitted through a pipe 14 to the rear side of an enlarged annular piston head 15 of a plunger valve 16 of the supply control valve. This equalizes the pressure forces acting in the opposite direction on the plunger such, for instance, as the fluid pressure on the end of the plunger nose and also within the annular chamber 19 which is supplied from a suitably controlled source. With the fluid pressure forces thus balanced the force of a spring 20 is sufficient to effect closing movement of the plunger automatically when the compartment is filled with liquid.

With all of the compartments filled and the supply of liquid shut off, the operator now turns a three-way valve 21, which may be in the form of a plug valve, to discharge fluid from pipes 22 and 23. Annular chamber 19 and fluid pressure in operating chambers 24 in the respective discharge valve mechanisms 6 are simultaneously vented. Upon release of pressure in chamber 24 of the discharge valves a spiral spring 25 encircling the plunger moves the plunger 26 rearwardly to permit fluid to flow from the vertical passage 27 to the discharge pipe 28, the outer end of which is provided with a suitable nozzle 29 for directing the liquid into a can which will be disposed immediately below.

As the measuring compartments discharge, their respective vents 13 will open to prevent any vacuum in the top thereof and thus allow the liquid to discharge freely through the nozzles. As the compartments discharge, the fluid pressure on the right end of plunger 16 drops to atmospheric pressure but the supply valve plunger 16 remains closed due to the fact that fluid pressure in the supply pipe 8 is not acting upon the entire surface of the plunger nose and also no fluid pressure is acting upon the front side of the annular piston 15 due to the annular chamber 19 being vented when the three-way valve 21 was turned to allow discharge of the compartments. The spring 20 is therefore sufficient to hold the supply plunger 16 in its closed position while the compartments are discharging.

When the compartments are discharged they may be refilled by the operator simply turning control valve 21 whereby fluid pressure is supplied from a pipe 21a (connected preferably to source pipe 8) through pipe 23 to the rear side of each of the discharge plungers 26 to close the same while at the same time fluid pressure flows through pipe 22 to the annular chamber 19 thereby opening plunger 16 against the force of spring 20. Refilling liquid is then supplied from the main source pipe 8, through header 9 and pipes 10 and 11 to the respective compartments. The compartment upon being filled will again cause fluid pressure to pass through pipe 14 to the rear side of plunger 16 and again close the same. The operator may then again turn valve 21 to vent pipes 22 and 23 and open discharge valve 26 while the supply valve 7 remains closed.

From the description of my improved valve structure and control therefor, it is seen that by actuating supply and discharge plungers 16 and 26 by fluid pressure supplied from the same source as that which supplied the compartments, any leakage which takes place will not in any way contaminate the water in the compartments. It is also seen that objections to leakage are eliminated, for any leakage past the valve plungers simply flows back into the compartments such as 2 and 3, avoiding any inaccuracy in the measured quantity. The quantity of fluid used for moving the valves is very small, which is particularly advantageous where distilled water is used for ice-making. It is further seen that irrespective of the number of compartments and discharge valve mechanisms the effort or attention required by the operator is no greater than if just one or a few compartments are used, for in any case only one valve mechanism need be operated, namely control valve 21, requiring slight mechanical effort. A further advantage is that the discharge valves do not have to seat simultaneously in order to insure complete closure of each valve as is necessary in certain prior mechanically operated valve arrangements. This result is obtained due to the independent operation of the valves relative to each other even though they are commonly controlled, it being noted that if one valve is closed prior to the others the operating fluid pressure holds the valve shut, while continuing to move the remaining valves to their closed position. My improved arrangement thus effects automatic operation or adjustment of independently operable commonly controlled discharge valves.

It will also be noted that the discharge valves 6 and inlet supply valve 7 are the same in structure except that the springs are disposed in one case on one side of the annular piston head and in the other case on the opposite side thereof and also in the case of the discharge valves a flat plate 27 covers the end of the operating chamber while in the case of the inlet or supply valve a suitable hollow cap 31 is provided to house the spring.

Combined with my improved valve mechanism and control is a liquid adjusting mechanism comprising a sleeve 32 threadedly mounted on the outside of the discharge pipe 27. By adjusting this sleeve along the discharge pipe the level to which the liquid in each compartment discharges may be determined. This adjustment is effected by the provision of a small rod 33 extending across and fixed to only the top edge of the sleeve 32 while a suitable operating rod 34 is adapted to have an open forked end drop over and engage the rod 33 thereby to be rotated by a suitable hand wheel 35 disposed above a suitable packing gland through which the rod 34 extends.

To permit ready access to the interior of each compartment so that the same may be cleaned if necessary and to provide an extremely simple arrangement to accomplish this feature pipe 27 is threaded in a flange 36 which is suitably bolted to a cooperating flange carried by an enlarged pipe 37 secured to the tank. By removal of the bolts which hold these two flanges together the valve discharge mechanism and liquid controlling sleeve 32 may be dropped downwardly while letting operating rod 34 hang, whereupon the operator may extend his arm upwardly into the respective compartment to effect the necessary cleaning or other operations.

Under certain conditions of operation it may be desired to supply filling liquid under low pressure, in which event the operating pressure may not be sufficient to effect positive operation of the control valves. To meet this condition the equalizing pipe 14 instead of being connected to the measuring compartments is connected to the right side of valve 21 (assuming valve 21 to now be a four-way valve). Any source of operating fluid under suitable high pressure is supplied through pipe 21a, as in the preferred form, in which event it will be seen that with the four-way control valve in one position, fluid pressure may be supplied from pipe 21a to pipes 22 and 23 thereby to close the discharge valve mechanism 6 and open the supply valve 7. By turning the control valve 90° the pipe 14 will be connected to supply pipe 21a and pipes 22 and 23 will be open to drain, whereupon supply valve 7 is closed and discharge valves 6 opened. In this arrangement the pipe 22 preferably is smaller than pipe 23, or is provided with a plug cock for throttling, thereby controlling the relative rates of operation of valves 6 and 7. It is also seen by this modified arrangement that the spring 20 may be dispensed with if the actuating fluid is under sufficient pressure. When desired two mechanically interconnected plug cocks may be used in place of cock 21 in order to provide positive sequence of valve operations with a time interval between the operations.

While the foregoing describes one specific form which my invention may assume, it is obvious that modifications thereof may be employed without departing from the spirit of my invention as set forth in the appended claims.

I claim:

1. A liquid measuring apparatus comprising, in combination, means forming a closed compartment, a liquid supply pipe for normally supplying fluid to said compartment under a pressure above atmospheric pressure, a fluid controlled valve adapted to close said supply pipe, and means for controlling the closing of said valve by the pressure of the fluid in said compartment automatically when said compartment is filled completely.

2. A measuring apparatus comprising, in combination, means forming a compartment, a discharge valve mechanism therefor, a fluid operated supply valve mechanism for said compartment, means for actuating said supply valve mechanism by the pressure of the fluid in said compartment, whereby when a predetermined condition of the fluid in said compartment is present said supply valve is closed automatically, and means for opening said discharge valve while said supply valve remains closed.

3. The combination set forth in claim 2 further characterized by the provision of means whereby upon closure of said discharge valve said supply valve is opened.

4. A liquid measuring apparatus comprising in combination, means forming a plurality of measuring compartments, fluid supply means, an individual fluid operated discharge valve mechanism for each compartment, and common fluid pressure control means for all of the discharge valves.

5. A measuring apparatus comprising, in combination, means forming a plurality of compartments each of which is provided with a fluid pressure operated discharge valve mechanism, a supply pipe for said compartments, a fluid pressure operated valve for controlling said supply pipe, and means for controlling all of said valves from a common source of fluid pressure.

6. The combination set forth in claim 5 further characterized by the provision of a single control valve adapted to open said discharge valves and to close said supply valve.

7. The combination set forth in claim 5 further characterized by the provision of means including a single control valve adapted to open said discharge valves and relieve operating pressure from said supply valve while retaining the latter in closed position.

8. A measuring apparatus comprising, in combination, means forming a compartment provided with a fluid pressure operated discharge valve mechanism, a fluid pressure operated supply valve for said compartment, said valves being separate from each other, and means for controlling said valves including control valve mechanism adapted to effect opening of said discharge valve and relieve operating pressure from said supply valve while the latter is retained in closed position.

9. A measuring apparatus comprising, in combination, means forming a liquid compartment having a discharge, a valve controlled vent passage for said compartment adapted to be closed by liquid therein, said vent being disposed in substantially the uppermost part of said compartment to permit substantially complete discharge of air therefrom, a fluid operated supply valve for said compartment, and means for controlling said supply valve by the liquid in said compartment automatically when the liquid in said compartment closes said vent.

10. A liquid measuring apparatus comprising, in combination, means forming a liquid measuring compartment, a discharge passage and an inlet passage therefor, a plunger valve mechanism for said discharge, and means for controlling both the opening and closing of said valve by fluid pressure.

11. A liquid measuring apparatus comprising, in combination, means forming a liquid measuring compartment adapted to contain liquid under pressure, and a fluid pressure operated discharge valve mechanism for said compartment including a plunger movable by fluid pressure to its closing position.

12. The combination set forth in claim 11 further characterized by the provision of a spring for moving said plunger to its open position upon release of the closing fluid pressure.

13. A liquid measuring apparatus comprising, in combination, a plurality of liquid measuring compartments each provided with a fluid pressure operated discharge valve mechanism, each of said valve mechanisms having a plunger provided with an enlarged head to form a piston and a casing in which said plunger and piston head are slidably disposed, whereby an internal fluid pressure chamber is provided, and means for supplying fluid pressure simultaneously to each of said internal valve chambers, to close said valves.

14. A measuring apparatus comprising, in combination, means forming a compartment provided with a fluid pressure operated discharge valve, a fluid pressure operated supply valve for said compartment, and means for actuating both opening and closing movement of one of said valves by fluid pressure, means for controlling said valves including control valve mechanism adapted to effect opening of said discharge valve and relieve operating pressure from said supply valve, and means for retaining the supply valve in closed position while the operating pressure is relieved therefrom.

15. A liquid measuring apparatus comprising, in combination, means forming a liquid measuring compartment, a discharge passage and an inlet passage therefor, a valve mechanism for said discharge, means for mechanically urging said valve in an opening direction, and means for moving the valve to its closed position by fluid pressure.

16. A liquid measuring apparatus comprising, in combination, means forming a liquid measuring compartment, a discharge passage and an inlet passage therefor, a valve mechanism for said discharge, means for mechanically urging said valve in an opening direction, and fluid pressure means for moving the valve to its closed position and for controlling the operation of said mechanical means which urges the valve open.

FRANK H. ROGERS.